United States Patent

Sharma et al.

[11] Patent Number: 6,069,871
[45] Date of Patent: May 30, 2000

[54] TRAFFIC ALLOCATION AND DYNAMIC LOAD BALANCING IN A MULTIPLE CARRIER CELLULAR WIRELESS COMMUNICATION SYSTEM

[75] Inventors: Sarvesh R. Sharma; Ahmad Jalali, both of Plano, Tex.

[73] Assignee: Nortel Networks Corporation, Ottawa, Canada

[21] Appl. No.: 09/036,191

[22] Filed: Mar. 6, 1998

Related U.S. Application Data

[60] Provisional application No. 60/053,444, Jul. 22, 1997.

[51] Int. Cl.$^7$ .......................... H04B 7/216; H04J 13/02; H04Q 7/22; H04Q 7/36
[52] U.S. Cl. .......................... 370/209; 370/331; 370/335; 455/62; 455/443; 455/452; 455/453; 455/525
[58] Field of Search .................................. 370/208, 209, 370/328, 329, 331, 335, 342; 455/62, 436, 439, 440, 443, 450, 452, 453, 456, 517, 524, 525, 560

[56] References Cited

U.S. PATENT DOCUMENTS

| | | |
|---|---|---|
| 5,267,261 | 11/1993 | Blakeney, II et al. ................. 370/335 |
| 5,299,198 | 3/1994 | Kay et al. . |
| 5,479,409 | 12/1995 | Dupuy et al. . |
| 5,487,101 | 1/1996 | Fletcher ................................. 379/60 |
| 5,499,386 | 3/1996 | Karlsson ............................. 455/33.2 |
| 5,577,022 | 11/1996 | Padovani et al. ..................... 370/335 |
| 5,579,306 | 11/1996 | Dent . |
| 5,633,915 | 5/1997 | Yang et al. ............................ 379/60 |
| 5,664,006 | 9/1997 | Monte et al. . |
| 5,682,380 | 10/1997 | Park et al. . |
| 5,754,959 | 5/1998 | Ueno et al. ........................... 455/453 |
| 5,825,762 | 10/1998 | Kamin, Jr, et al. .................... 370/335 |

*Primary Examiner*—Alpus H. Hsu
*Attorney, Agent, or Firm*—Bruce Garlick

[57] ABSTRACT

A wireless communication system provides wireless service to a mobile unit operating within a service area and includes a mobile switching center, at least one base station controller, a first plurality of base stations and a second plurality of base stations. The first plurality of base stations couple to the at least one base station controller and operate on a first carrier frequency. The second plurality of base stations couple to the at least one base station controller and operate on a second carrier frequency. The mobile switching center and the at least one base station controller operate to assign the mobile unit to at least one of the first plurality of base stations or at least one of the second plurality of base stations based upon available base station capacities. The wireless communication system may operate according to a code division multiple access protocol. In determining the capacity of the base stations, candidate base stations are first determined, with such candidate base stations selected based upon an operating location of the mobile unit. The candidate base stations include base stations from both the first plurality of base stations and the second plurality of base stations that could service the mobile unit at its present operating location. Once the candidate base stations are determined, capacity requests are sent to the candidate base stations. The base stations then respond with capacity responses. Based upon capacity responses received, the mobile unit is assigned to at least one of the first plurality of base stations or at least one of the second plurality of base stations. Operation may be undertaken when setting up a call or during the servicing of a call. During servicing of a call, operations commence upon receipt of a pilot signal strength measurement message received from the mobile unit.

47 Claims, 13 Drawing Sheets

M = MULTIPLE CARRIER CELLS
B = BORDER CELLS
S = SINGLE FREQUENCY CELLS

TRAFFIC ALLOCATION AND DYNAMIC LOAD BALANCING IN A MULTIPLE CARRIER CELLULAR WIRELESS COMMUNICATION SYSTEM

CROSS-REFERENCE TO RELATED APPLICATION

The present application claims priority pursuant to 35 U.S.C. Sec. 119(e) to U.S. Provisional Application Ser. No. 60/053,444, filed Jul. 22, 1997, pending, which is hereby incorporated herein by reference in its entirety.

BACKGROUND

1. Technical Field

This invention relates generally to wireless communication systems; and more particularly to load assignment and dynamic load balancing within a multiple carrier frequency wireless communication system.

2. Related Art

Cellular wireless communication systems are generally known to include a plurality of base stations dispersed across a geographic service area. Each of the base stations includes at least one antenna and a base station transceiver system (BTS) and provides wireless service within a respective cell. The BTSs couple to base station controllers (BSCs) with each BSC serving a plurality of BTSs. The BSCs also couple to a mobile switching center (MSC) which interfaces to the Public Switched Telephone Network (PSTN) and other MSCs. Together, the BTSs, BSCs and the MSC form a wireless network which provides wireless coverage to mobile units operating within a respective service area.

Wireless communication systems operate according to various standards. One particular standard in place worldwide is the code division multiple access (CDMA) protocol. Code division multiple access (CDMA) is a direct sequence spread spectrum system in which a number, at least two, of spread-spectrum signals communicate simultaneously, each operating over the same frequency band. In a CDMA system, each user is given a distinct Walsh code which identifies the user. For example, if a first user has a first chip code, $g_1(t)$, and a second user a second chip code, $g_2(t)$, etc., then a receiver located in a BTS, desiring to listen to the first user, receives at its antenna all of the energy sent by all of the users. However, after despreading the first user's signal, the receiver outputs all the energy of the first user but only a small fraction of the energies sent by the second, third, etc., users.

CDMA is interference limited such that the number of users that can use the same spectrum and still have acceptable performance is determined by the total interference power that all of the users, taken as a whole, generate. Thus, the number of users that may be supported by each BTS is limited. To increase the capacity of CDMA systems, additional base stations may be added to increase the number of cells within the service area. However, because load is often concentrated in a small geographic area, even with the addition of cells, particular cells may remain overloaded while neighboring cells are lightly loaded.

Thus, another solution has been proposed to overcome overcrowding in CDMA systems. This solution includes assigning multiple carriers within a single service area with the multiple carriers used to service overlaying cells. With overlaying frequency coverage, some mobile units are serviced on one of the carrier frequencies while other of the mobile units are serviced on other of the carrier frequencies. By assigning multiple frequency resources, the overall capacity of the wireless communication system is increased.

However, due to the nature of accessing the CDMA system and assigning resources in the CDMA system, one frequency may tend to become loaded at a rate greater than the other frequency. Thus, there is an inherent problem in such wireless communication systems in properly allocating usage amongst the multiple carrier frequencies to maximize carrier traffic for a given blocking probability.

Thus, there is a need in the art for a system and associated method of operation for allocating load amongst multiple carrier frequencies in a multiple carrier frequency system and in balancing load in the multiple carrier frequency system.

SUMMARY OF THE INVENTION

A wireless communication system constructed according to the present invention overcomes the above cited shortcoming relating to load management in multiple carrier frequency systems as well as additional shortcomings. The wireless communication system provides wireless service to a mobile unit operating within a service area and includes a mobile switching center, at least one base station controller, a first plurality of base stations and a second plurality of base stations. The first plurality of base stations couple to at least one base station controller and operate on a first carrier frequency. The second plurality of base stations couple to at least one base station controller and operate on a second carrier frequency. According to the present invention, the mobile switching center and at least one base station controller operate to assign the mobile unit to at least one of the first plurality of base stations or at least one of the second plurality of base stations based upon available base station capacities. The wireless communication system may operate according to a code division multiple access protocol. However, in other implementations, the wireless communication system may operate according to other protocols such as a time division multiple access protocol or the Global Standard for Mobility (GSM) protocol, for example.

In determining the capacity of the base stations, candidate base stations are first determined, with such candidate base stations selected based upon an operating location of the mobile unit. The candidate base stations include base stations from both the first plurality of base stations and the second plurality of base stations that could service the mobile unit at its present operating location. Once the candidate base stations are determined, capacity requests are sent to the candidate base stations. The base stations then respond with capacity responses. Based upon capacity responses received, the mobile unit is assigned to at least one of the first plurality of base stations or at least one of the second plurality of base stations. Operation according to the present invention may be undertaken when setting up a call or during the servicing of a call. During servicing of a call, operations commence upon receipt of a pilot signal strength measurement message received from the mobile unit.

In a typical construction, the first plurality of base stations and the second plurality of base stations provide overlaying wireless coverage. In such construction, cells serviced by the second plurality of base stations overlay cells serviced by some of the first plurality of base stations such that the first carrier frequency is supported throughout the service area and the second carrier frequency is supported in a portion of the service area. Multi-carrier border cells support both the first carrier frequency and the second carrier frequency and border portions of the service area that support only the first carrier frequency or that border neighboring service areas. Operation in the multi-carrier border cells enables mobile units to roam between areas supported by multiple carrier frequencies and areas supported by a single carrier frequency.

Of course, the teachings of the present invention may be readily applied to wireless communication systems that support in excess of two carrier frequencies. Further, multi-carrier border cells may lie between separate systems, one which supports multiple carrier frequencies and one which does not. In either case, the multi-carrier border cells provide transition operations for mobile units moving between multi-carrier areas and single carrier areas or between areas supporting differing sets of carriers.

Calls originating in cells supporting both the first and second carrier frequencies may be originated on either the first carrier frequency or the second carrier frequency. However, calls originating in cells supported by only a single carrier frequency must be originated on the supported carrier frequency. In roaming after call origination, soft handoff may be used when roaming to cells supporting the current carrier frequency. However, hard handoff must be used when roaming to cells not supporting the current carrier frequency. In both cases, operations according to the present invention are undertaken to balance the load between the first carrier frequency and the second carrier frequency.

Moreover, other aspects of the present invention will become apparent with further reference to the drawings and specification which follow.

DETAILED DESCRIPTION OF THE DRAWINGS

Figure 1:
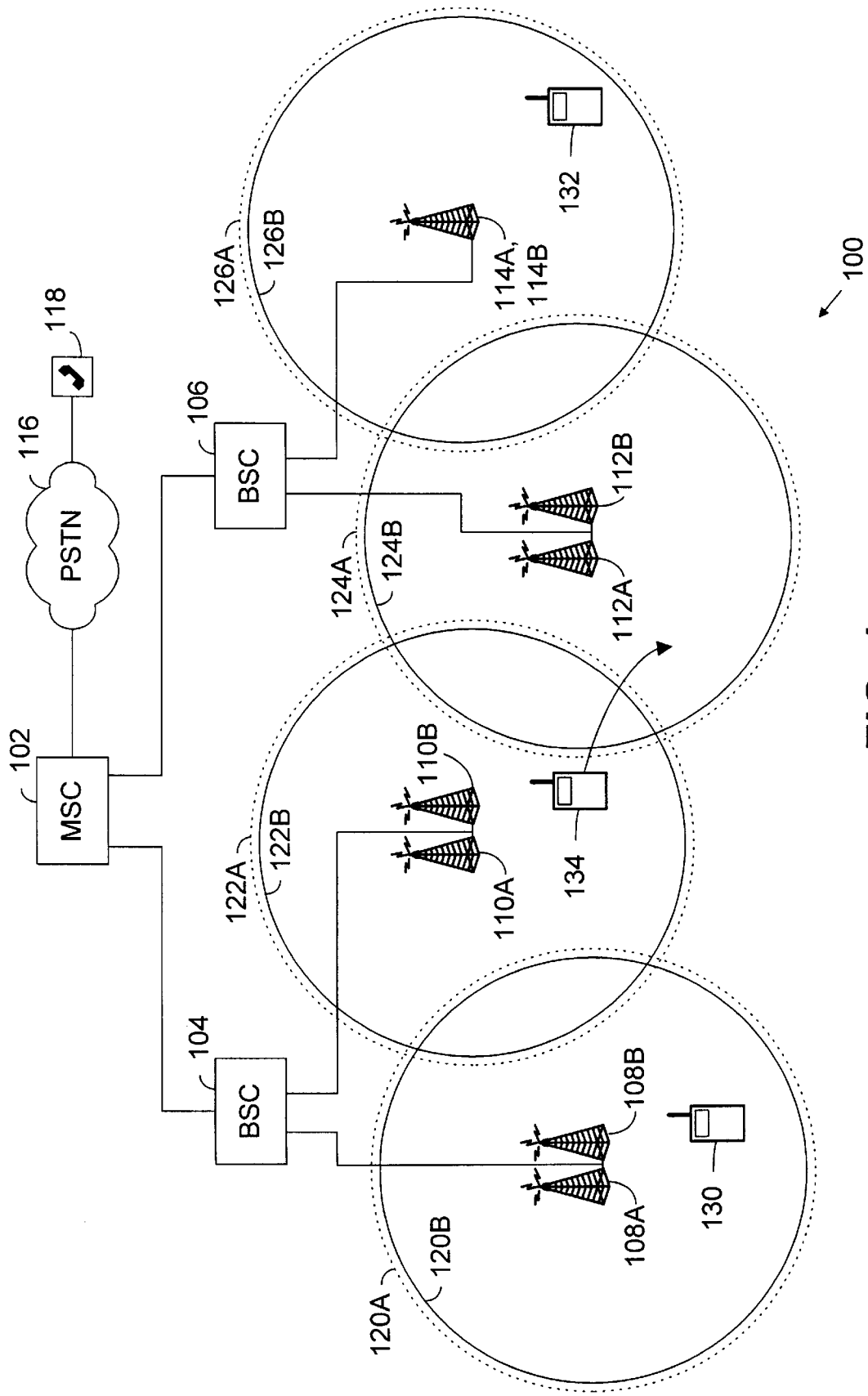
FIG. 1 is a diagram illustrating a wireless communication system constructed according to the present invention.

FIG. 1 illustrates a wireless communication system 100 constructed according to the present invention which includes a plurality of cells serviced by multiple carrier frequencies. In the illustrated embodiment, the wireless communication system 100 operates according to a code division multiple access (CDMA) standard, in particular the TIA/EIA/IS95 CDMA standard, modified as required to accomplish the teachings of the present invention. The principles of the present invention also apply to other wireless communication systems operating according to other standards, as well, in which multiple carrier frequencies overlay one another to increase the capacity of the wireless communication system 100.

The wireless communication system 100 includes a mobile switching center (MSC) 102, base station controllers (BSCs) 104 and 106, and a plurality of base stations, each of which includes an antenna and a base station transceiver subsystem (BTS). The MSC 102 couples the wireless communication system 100 to the PSTN 116. The wireless communication system services calls between telephone 118 connected to the PSTN 116, for example, and any of a plurality of mobile units 130, 132 and 134 operating within the wireless communication system. The wireless communication system 100 also services calls among the plurality of mobile units 130, 132 and 134.

BTSs 108A, 108B, 110A and 110B couple to BSC 104 while BTSs 112A, 112B, 114A and 114B couple to BSC 106. The BTSs are constructed such that two carrier frequencies are supported within the wireless communication system. BTS 108A provides service on a first carrier frequency within cell 120A and BTS 108B provides service on a second carrier frequency within cell 120B, cell 120A substantially overlying cell 120B. Likewise, BTS 110A provides wireless coverage on the first carrier frequency in cell 122A and BTS 110B provides wireless coverage on the second carrier frequency in overlying cell 122B. Further, BTSs 112A and 114A provide wireless coverage on the first carrier frequency in cells 124A and 126A, respectively, and BTSs 112B and 114B provide wireless coverage on the second carrier frequency in overlying cells 124B and 126B, respectively. By providing wireless coverage on the two carrier frequencies, the capacity provided by the wireless communication system 100 is approximately double that which would be available with a single carrier frequency. Each of the cells within the wireless communication system 100 may also be divided into sectors as is generally known.

The wireless communication system 100 was originally constructed to provide coverage on a single carrier frequency and then expanded to support a second carrier frequency due to an increase in load growth within the service area. To support operation on the second carrier frequency, additional towers were added to service BTSs 108B, 110B and 112B. However, BTS 114B is serviced by the same tower as BTS 114A, with an antenna added to the existing tower to support BTS 114B. The principles of the present invention apply equally to wireless communication systems constructed originally to support two or more carrier frequencies.

In an example of an operation of the wireless communication system 100, mobile unit 130 initiates a call within cell 120A or 120B which is intended for a destination telephone 118 coupled to the PSTN 116. Assuming that the mobile unit 130 responds on a control channel of the first carrier frequency, the mobile unit 130 contacts BTS 108A, seeking to initiate the call. BTS 108A then sends an origination message via the BSC 104 to the MSC 102. The MSC 102 then requests the BSC 104 to allocate resources to service the call and commences to complete the call via the PSTN 116 to destination 118. The BSC 104 then sends capacity requests to each BTS that may service the call within the wireless communication system 100, e.g. BTSs 108A and 108B serving cells 120A and 120B. The BTSs 108A and 108B respond with capacity indications and, based upon the capacity indications, the BSC 104 selects BTS 108B to service the call on the second carrier frequency. The call is then completed via BTS 108B, BSC 104, MSC 102 and the PSTN 116. Of course, in another operation, the BSC 104 could select BTS 108A to service the call on the first carrier based upon differing capacity indications.

In another operation of the wireless communication system 100 a call originates from telephone 118 and is sought to be delivered to mobile unit 132. When the telephone 118 contacts the MSC 102 via the PSTN 116, the MSC 102 initiates a page to the mobile unit 132 according to paging operations for the wireless communication system 100. The mobile unit 132 then responds to the page via BTS 114A, for example. The BTS 114A responds to the MSC 102 via the BSC 106 and the interacts with BSC 106 to set up the call. In response, the BSC 106 queries BTSs 114A and 114B for capacity information. Based upon the responses received from BTSs 114A and 114B, the BSC 106 assigns a traffic channel on the first carrier frequency, serviced by BTS 114A and corresponding to cell 126A. The call is then completed via BTS 114A, BSC 106, MSC 102 and the PSTN 116. Of course, in another operation based upon differing capacity indications, the BSC 106 could assign a traffic channel on the second carrier frequency serviced by BTS 114A within cell 126B.

In still another example of operation according to the present invention, a mobile unit 134 has previously established a traffic channel on the first carrier frequency within cell 122A served by BTS 110A. However, the mobile unit 134 is roaming toward cells 124A and 124B served by BTSs 112A and 112B, respectively. While roaming, the mobile unit 134 receives pilot signals provided by BTSs 110A and 112A on the first carrier frequency. When pilot signal strength criterion have been satisfied, the mobile unit 134 sends a pilot signal strength measurement message (PSMM) to BSC 104 via BTS 110A, indicating that it desires to place/keep BTS 112A and BTS 110A in its active set. Prior to directing the handoff, the wireless communication system 100 performs dynamic load balancing to balance loading on the first carrier frequency and the second carrier frequency. In performing dynamic load balancing, the BSCs 104 and 106 query BTSs 110A, 110B and 112A, 112B, respectively to determine loading. Depending upon loading in cells 122A, 122B, 124A and 124B, the wireless communication system 100 either directs the mobile unit 134 to execute a soft handoff on the first carrier frequency to BTSs 110A and 112A or to execute a hard handoff by moving from the first carrier frequency to the second carrier frequency served to BTSs 110B and 112B.

Figure 2A:
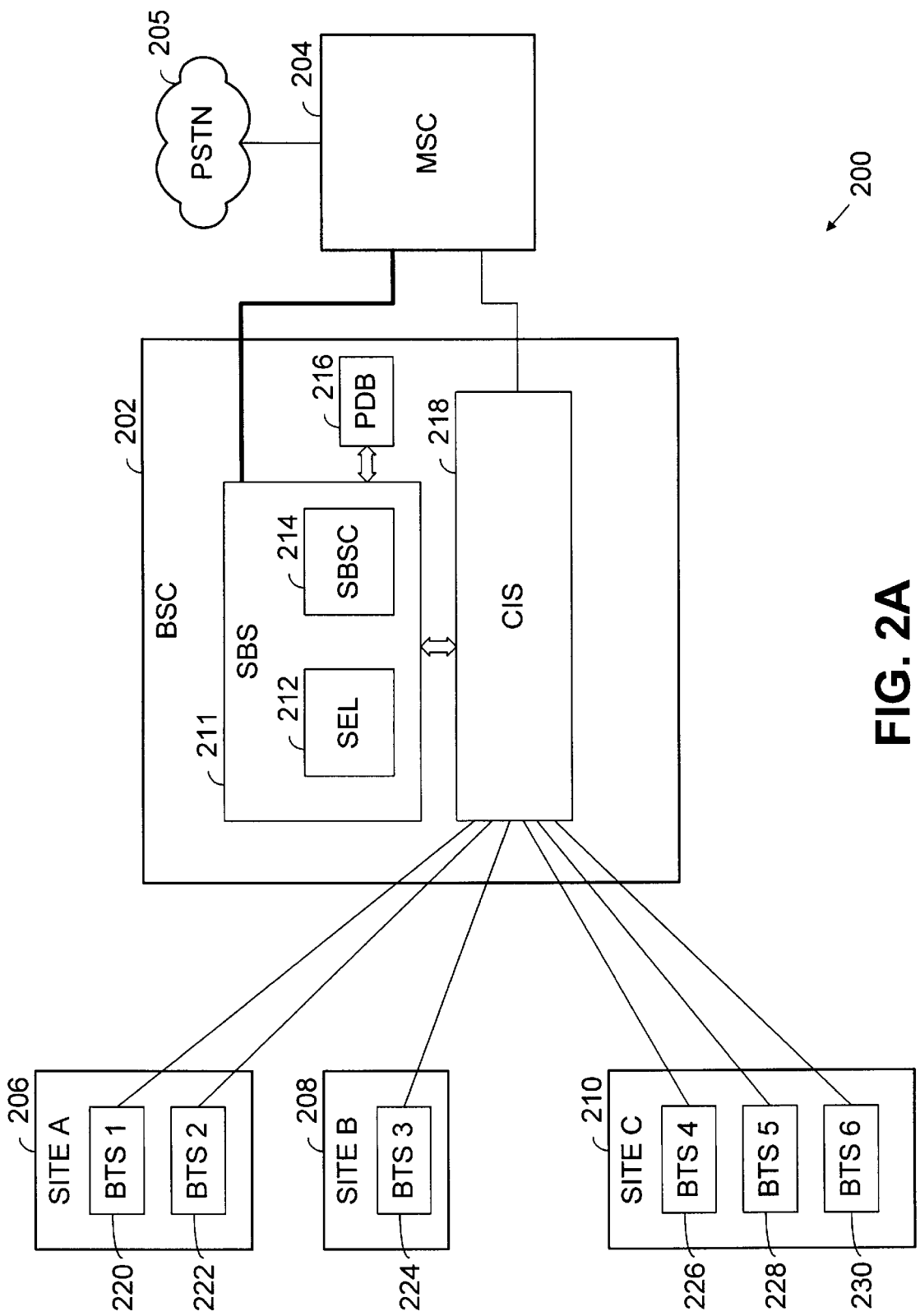
FIG. 2A is a block diagram illustrating various components of the wireless communication system previously introduced in FIG. 1.

FIG. 2A illustrates components of wireless communication system 200 constructed according to the present invention. Illustrated are a BSC 202, an MSC 204 coupled to the PSTN 205 and a plurality of BTS sites 206, 208 and 210. BTS site A 206 includes BTS 1 220 which supports a first carrier frequency and BTS 2 222 which supports a second carrier frequency. BTS site B 208 includes BTS 3 224 which supports only the first carrier frequency. BTS site C 210 includes 3 BTSs, BTS 4 226 which supports the first carrier frequency, BTS 5 228 which supports the second carrier frequency and BTS 6 230 which supports a third carrier frequency. In a typical installation, other BTS sites couple to the BSC 202 as well to provide coverage throughout a service area.

The BSC 202 includes a selector bank subsystem (SBS) 211, a pilot data base (PDB) 216 and a CDMA interconnect system (CIS) 218. The SBS 211 includes a selector bank (SEL) 212 and a SBS controller (SBSC) 214. The SBS 211 as well as the CIS 218 couple to the MSC 204. Further, the CIS 218 couples to the BTSs 220 through 230 contained at the various sites and the SBS 211. The SBS 211 couples to the PDB 216 and controls the SEL 212 to provide communication, in conjunction with the CIS 218, between the MSC 204 and the BTSs 220–230. The SBSC 214 operates to perform multiple carrier frequency allocation and dynamic load balancing according to the present invention to allocate resources in servicing calls on the various carrier frequencies supported by the wireless communication system.

Figure 2B:
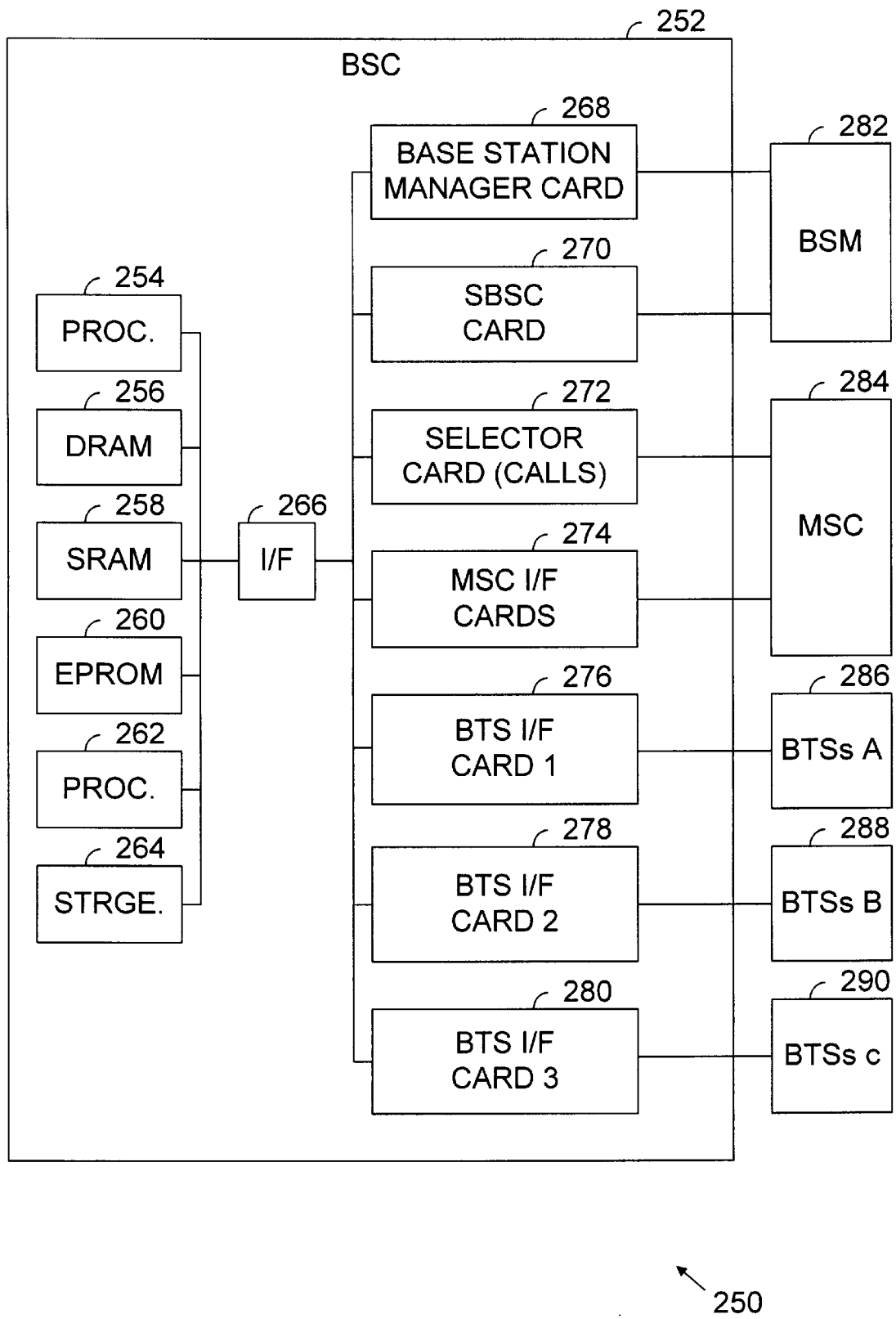
FIG. 2B is a block diagram illustrating components of a base station controller constructed according to the present invention.

FIG. 2B illustrates an alternate construction of components of a wireless communication system 250 according to the present invention, with particular description of a BSC 252. The BSC 252 couples to a base station monitor 282, a mobile switching center 284 and BTSs group A 288, group B 288 and group C 290, each of which includes a plurality of BTSs. The BSC 252 includes a base station manager card 268 and an SBSC card 270, both of which couple to the base station manager 282. A selector card 272 and an MSC interface card 274 couple to the MSC 284. BTS interface card 1 276 couples to BTS group A 286, BTS interface card 2 278 couples to BTS group B 288 and BTS interface card 3 280 couples to BTS group C 290. These cards 268 through 280 allow the BSC 252 to perform the operations consistent with the present invention in initially allocating resources and in performing dynamic load balancing in the multiple carrier frequency system.

The BSC 252 also includes a processor 254, dynamic RAM 256, static RAM 258, EPROM 260, and bulk storage that couple to the cards 268 through 280 via interface 266. Such components perform overall management of the BSC 252. Operations of the present invention are accomplished by these components and the interface cards 268–280 contained in the BSC 252. As is generally known in the art, electronic processing equipment, such as the processor 254 and components of the interface cards 268–280 contained within the BSC 252 may be programmed to perform specific operations. The electronic processing equipment may be constructed specifically to accomplish operations consistent with the present invention or may be generally constructed, and then programmed specifically to perform operations according to the present invention.

Figure 3:
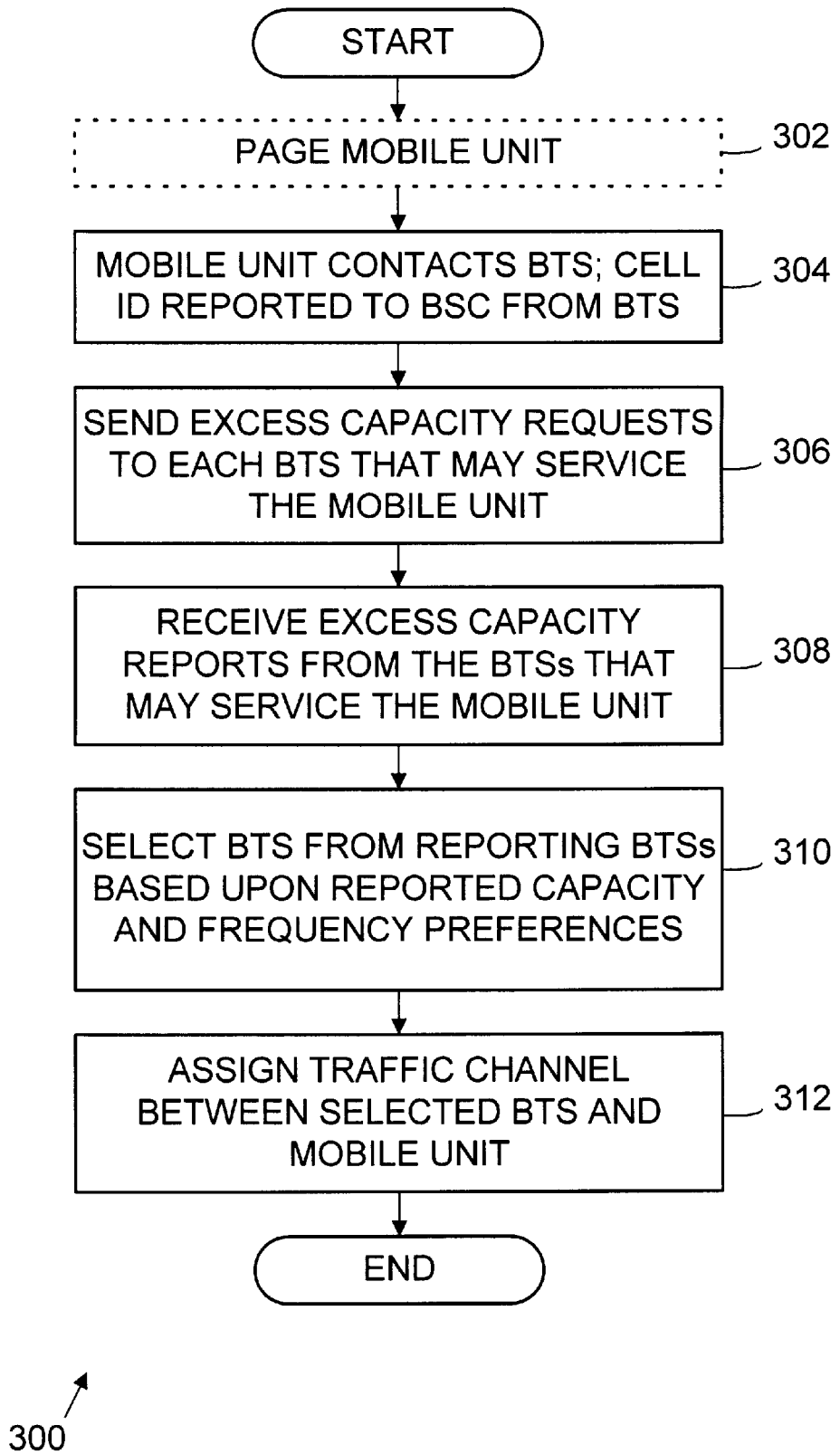
FIG. 3 is a logic diagram illustrating, in general, operation of the wireless communication system in allocating resources among multiple carrier frequencies in setting up and servicing a call to a mobile unit.

FIG. 3 illustrates operation 300 of a wireless communication system according to the present invention in allocating resources on their respective carrier frequencies upon initiation of a call. Operation commences at optional step 302 where a mobile unit is paged by the wireless communication system. When the mobile unit requests to establish a call, no page is sent to the mobile unit and step 302 is not performed. At step 304, the mobile unit communicates with the wireless communication system, either in response to the page sent at step 302 or when attempting to establish the call. The BTS communicating with the mobile unit then contacts its serving BSC, sending its cell ID to the BSC. The BSC relays this information to the MSC.

In one embodiment of the present invention, control channels are supported only on one carrier frequency of the multiple carrier frequencies supported across the wireless communication system. In other embodiments, control channels are supported on more than one carrier frequency. Depending upon the embodiment, and the operations supported by the mobile unit, the mobile unit contacts a BTS on a carrier frequency that supports a control channel.

Next, at step 306, the MSC serving the BSC directs the BSC to allocate resources to service the call. In response, the BSC determines candidate BTSs to service the call and seeks capacity information from each candidate BTSs. At step 308, the BSC receives the excess capacity reports from the candidate BTSs that respond. While it is desired that each candidate BTS respond to indicate its excess capacity, some of the candidate BTSs may not respond. With the reported excess capacity information received, at step 310, the BSC selects at least one BTS from those reporting based upon the reported excess capacities and frequency preferences for the particular operation. As was previously described, multiple BTSs may serve a common area on differing carrier frequencies. Thus, a particular carrier frequency is resultantly selected at step 310. After the selection is made, operation proceeds to step 312 wherein a traffic channel serviced by the selected BTS(s) on the selected carrier frequency is assigned and the call is serviced until it is complete.

Figure 4:
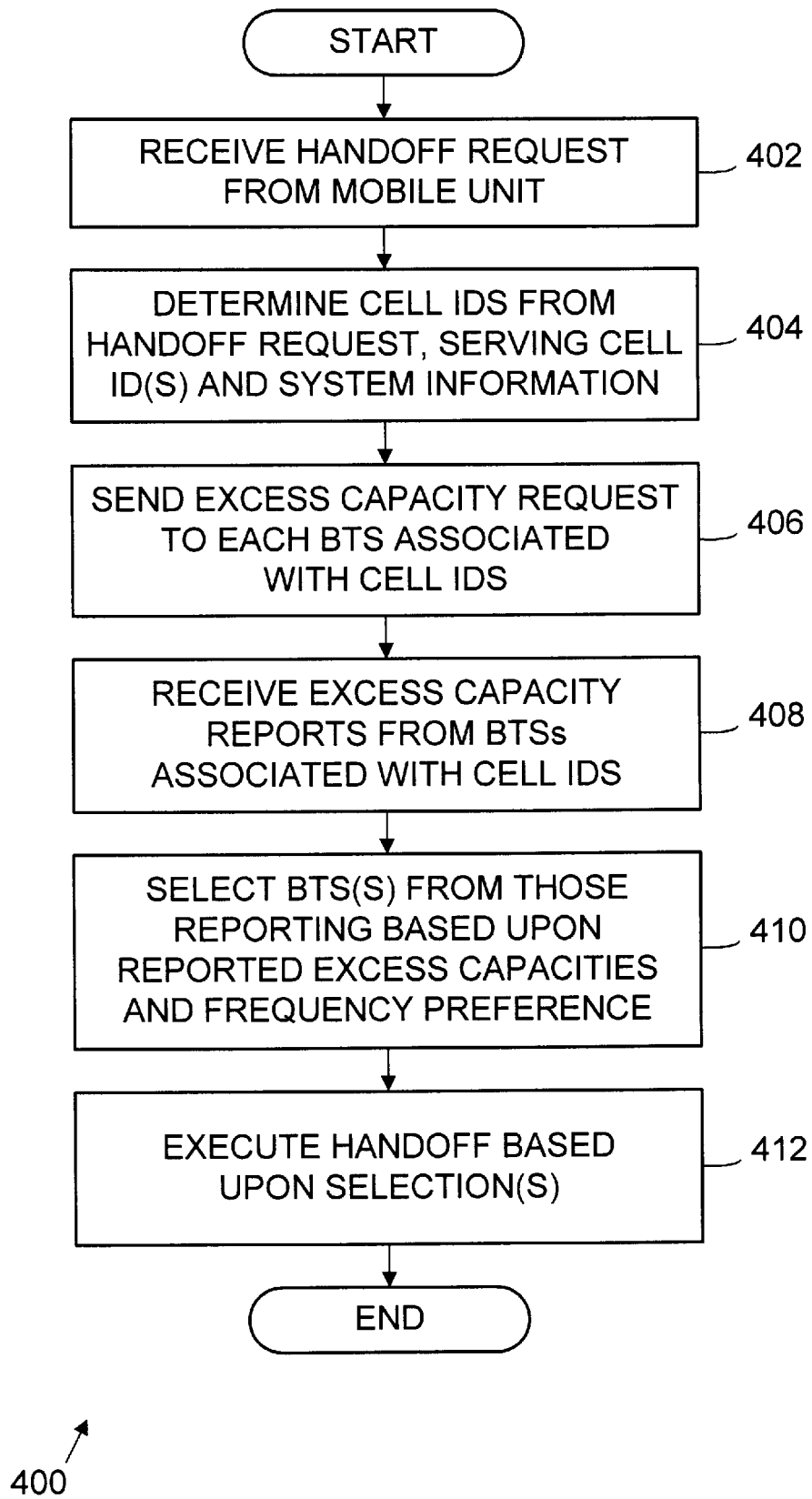
FIG. 4 is a logic diagram illustrating, in general, operation of the wireless communication system in performing dynamic load balancing among a plurality of carrier frequencies within the wireless communication system.

FIG. 4 illustrates operation 400 according to the present invention in dynamically balancing traffic serviced by the wireless communication system. Operation commences at step 402 wherein the system receives a handoff request from the mobile unit. The handoff request would typically be in the form of a PSMM in which the mobile unit requests to add particular base stations, corresponding to the reported pilot signals, to its active set.

Next, at step 404, cell IDs are determined from the PSMM for candidate base stations. Further, based upon the serving cell IDs, additional candidate base stations are determined, such additional candidate base stations serving the same area but operating on other carrier frequencies. In determining such candidate base stations, the BSC may access the pilot database 216 that was previously illustrated in FIG. 2A. Once all candidate base stations have been identified, the BSC sends excess capacity requests to each candidate BTS. At step 408, the BSC receives excess capacity reports from the candidate BTSs. The BSC then selects one or more BTSs from those reporting based upon reported excess capacities and frequency preferences at step 410. Then, at step 412, the handoff is executed based upon the selections previously made. The handoff executed at step 412 is a soft handoff if the mobile unit continues to be served on the same carrier frequency. However, if the mobile unit is moved to a different carrier frequency, the handoff is a hard handoff.

Figure 5A:
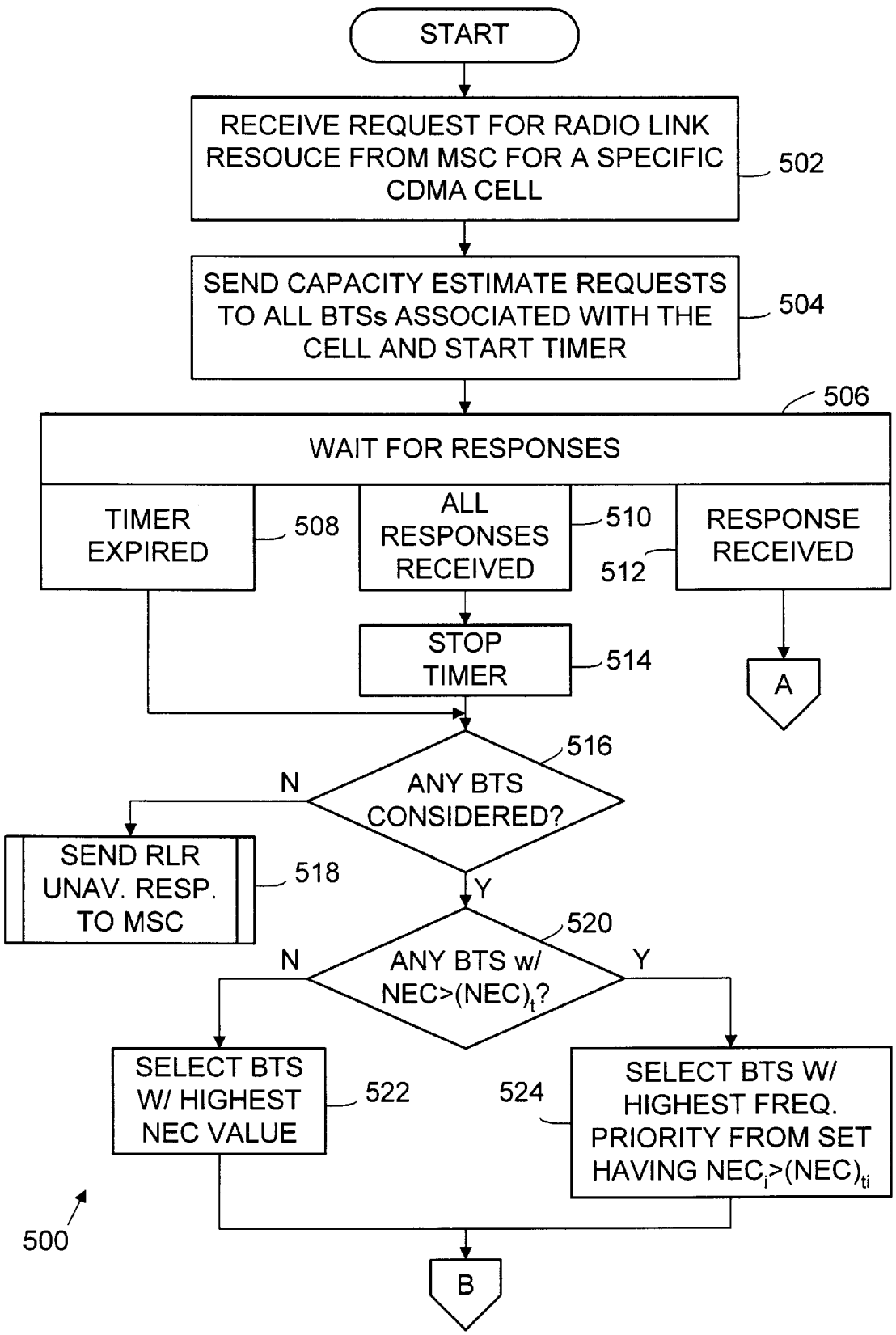
FIGS. 5A and 5B are logic diagrams illustrating operation of the wireless communication system in allocating load among multiple carrier frequencies when setting up a call.
Figure 5B:
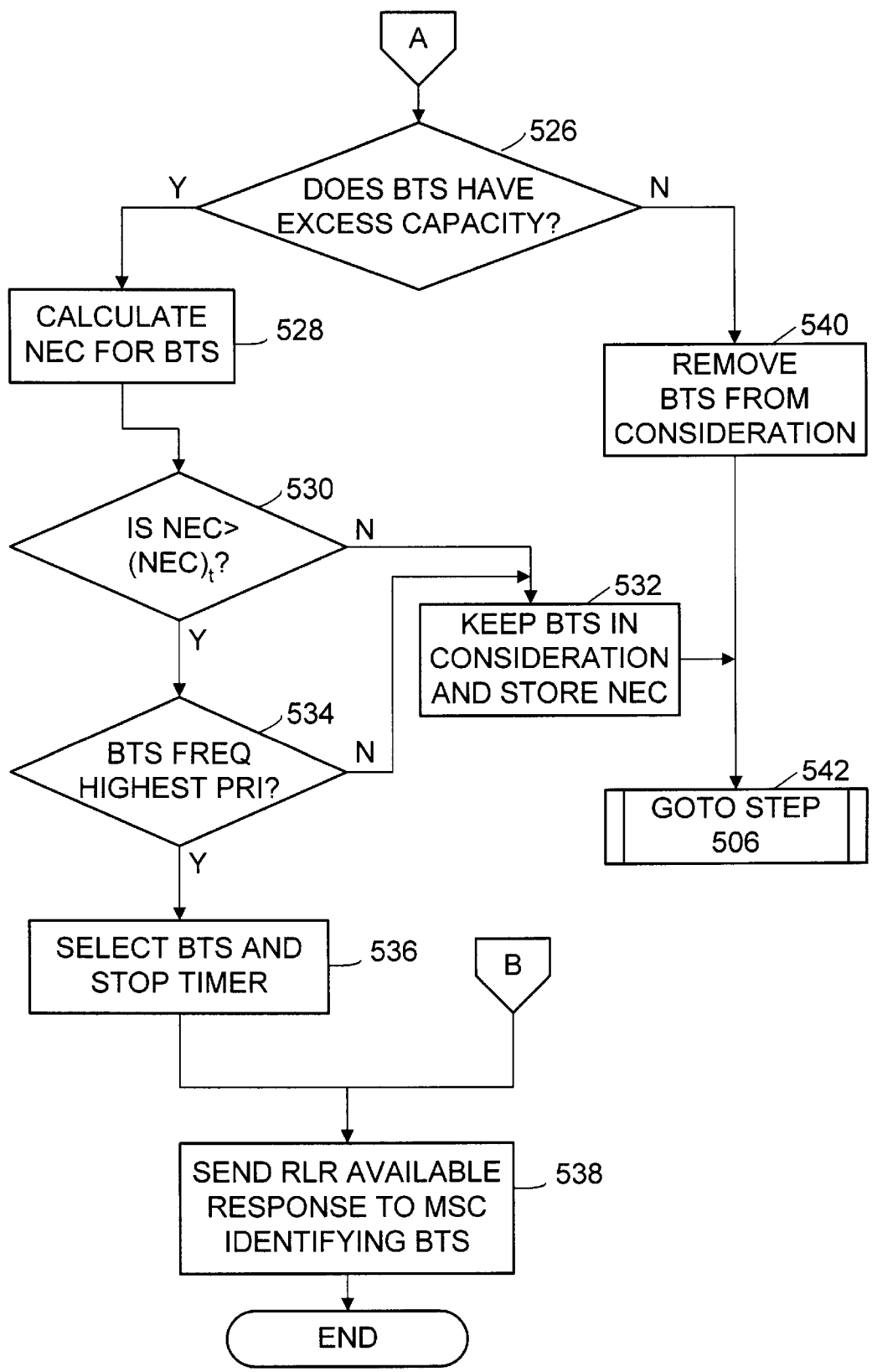

FIGS. 5A and 5B illustrate in greater detail allocation of resources of a wireless communication system constructed according to the present invention upon call initiation, with particular applicability to CDMA operation. Referring first to FIG. 5A, operation commences at step 502 wherein a BSC has received a request for radio link resources from an MSC for a specific CDMA cell. Such request is sent by the MSC in attempting to complete a call that was either initiated by a mobile unit or that is to be terminated to a mobile unit. Then, at step 504, the BSC serving the specific CDMA cell sends capacity estimate requests to all BTSs associated with the cell and starts a timer.

Operation then moves to step 506 wherein the BTS waits for responses to the capacity estimates. If the timer expires at step 508, operation moves to step 516. If all responses have been received at step 510, the timer is stopped at step 514 and operation also moves to step 516. Finally, from step 506 if a response is received, operation moves via off page connector to FIG. 5B. The following definitions and equations may be used in one particular embodiment to determine excess capacity for a particular BTS.

Definitions:

MCTA—Multi-Carrier Traffic Allocation

BSC—Base Station Controller

BTS—BaseStation Transceiver Subsystem

MSC—Mobile Switching Center

EFC—Excess Forward Link Capacity=(Maximum Allowable Forward Link Power—Current Forward Link Power)

$(EFC)_{bt}$—Excess Forward Link Capacity Blocking Threshold. The call is blocked if EFC falls below $(EFC)_{bt}$.

ERC—Excess Reverse Link Capacity=(Thermal Noise Floor at the Base Station/Total Receive Power at the Base Station)

$(ERC)_{bt}$—Excess Reverse Link Capacity Blocking Threshold. The call is blocked if ERC falls below $(ERC)_{bt}$.

ECE—Excess Number of Channel Elements.

$(ECE)_{bt}$—Excess Channel Element Blocking Threshold. The call is blocked if ECE falls below $(ECE)_{bt}$.

EWC—Excess Number of Walsh Codes $(EWC)_{bt}$—Excess Walsh Code Blocking Threshold. The call is blocked if EWC falls below $(EWC)_{bt}$.

NEC—Net Excess Capacity. This is the maximum excess capacity of a BTS. It is calculated by taking into account EFC, ERC, $(EFC)_{bt}$, $(ERC)_{bt}$, ECE and EWC as follows:

First, translate ERC and EFC into number of additional radio links possible.

M=Number of current users served by the sector (cell).

$N_r$=Number of additional links possible before reverse link blocking is encountered=$(N_{pole}(1-(ERC)_{bt})-M)$ where $N_{pole}=M/(1-ERC)$ $N_f$=Number of additional links possible before forward link blocking is encountered=$(EFC-(EFC)_{bt})/P_{avg}$ where $P_{avg}$ is the average power per user.

$P_{avg}$=(current total traffic channel transmit power/M)

$N_c$=Number of additional links possible before number of channel elements are exhausted=ECE $N_w$=Number of additional links possible before number of walsh codes are exhausted=EWC The maximum net excess capacity is limited by the minimum value of $N_r$, $N_f$, $N_c$ and $N_w$. For example even if $N_r$, $N_f$ and $N_w$ are high but no channel elements are available i.e. $N_c=0$, the net excess capacity would be zero.

NEC=min ($N_r$, $N_f$, $N_c$, $N_w$)

$(NEC)_t$—Net Excess Capacity Threshold. This is the value above which the frequency is considered to be lightly loaded.

According to these equations, each of the BTSs that has been queried may provide its NEC and $(NEC)_t$ to the BSC. In a desired operation, each of the queried BTSs will respond to the BSC with the requested information.

At step 516 it is determined whether any BTS is considered for allocation. No BTSs will be considered if none responded or if each responding BTS indicates that it has no excess capacity. If no BTS is considered, operation proceeds to step 518 wherein a send radio link resource unavailable response is sent from the BSC to the MSC to indicate that the call cannot be serviced. However, if any BTS has been considered at step 516, operation proceeds to step 520 where it is determined whether any of the BTSs that have responded have an NEC greater than $NEC_t$. If not, operation proceeds to step 522 wherein the BTS with the highest NEC value is selected. If so, operation proceeds to step 524 wherein the BTS with the highest frequency priority from the set of responding BTSs that have an $NEC_i$ that is greater than $NEC_{ti}$. $NEC_{ti}$ is set by the system operator.

Referring now to FIG. 5B, from both steps 522 and 524 operation proceeds via off screen connector B to step 538 of FIG. 5B where a send radio link resource available response is sent to the MSC identifying the selected BTS. The call is then completed and serviced by the selected BTS. Operation also proceeded from step 512 of FIG. 5A to step 526 of FIG. 5B when a response is received at step 506. At step 526, it is determined whether the BTS has excess capacity. If the BTS does have excess capacity, operation proceeds to step 528 wherein the NEC is calculated for the particular BTS. However, if the BTS does not have excess capacity it is removed from consideration at step 540 and operation proceeds at step 542 back to step 506 of FIG. 5A. After calculating the NEC for the BTS at step 528, it is determined whether the NEC is greater than the $NEC_t$ at step 530. If the NEC is not greater than the $NEC_t$, operation proceeds to step 532 wherein the BTS is kept in consideration and the NEC is stored and then to step 542 wherein operation proceeds again to step 506.

If at step 530 it is determined that the NEC is greater than $NEC_t$ operation proceed to step 534 wherein it is determined whether the BTS frequency has the highest priority. If not, operation proceeds again to step 532. However, if at step 534 it is determined that the BTS frequency has the highest priority, operation proceed to step 536 wherein the BTS is selected and the timer is stopped. From step 536 operation proceeds then to step 538 wherein the radio link resource available response is sent to the MSC identifying the selected BTS.

In another embodiment of the operation described with respect to FIGS. 5A and 5B, multiple BTSs could be selected. As is known, multiple BTSs often service a single call within CDMA systems. Multiple BTSs could also be selected in the subsequent operation described with reference to FIGS. 6A and 6B in an alternate embodiment.

Figure 6A:
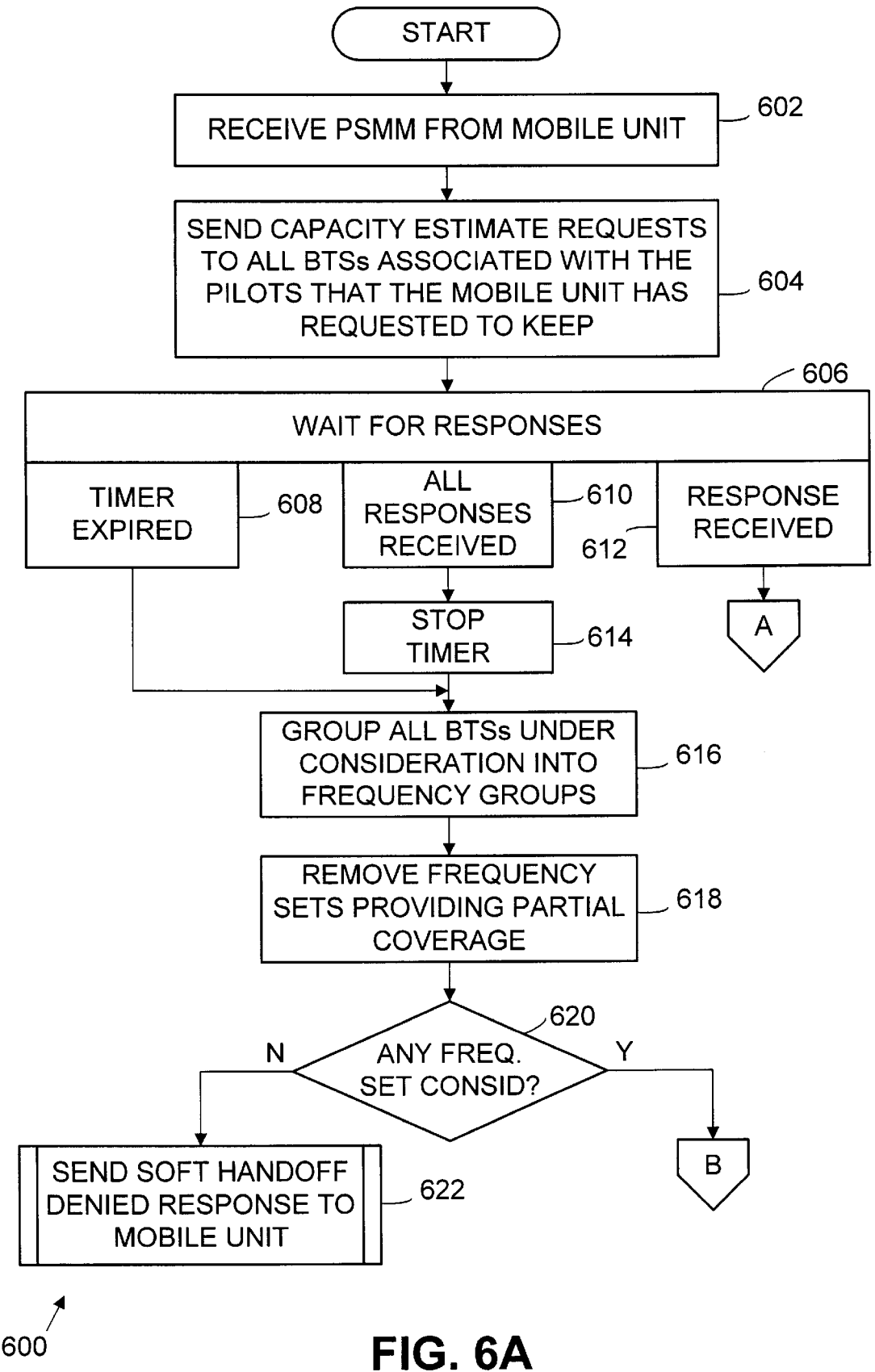
FIGS. 6A and 6B are logic diagrams illustrating operation of the wireless communication system in dynamically balancing load among multiple carrier frequencies while servicing a call.
Figure 6B:
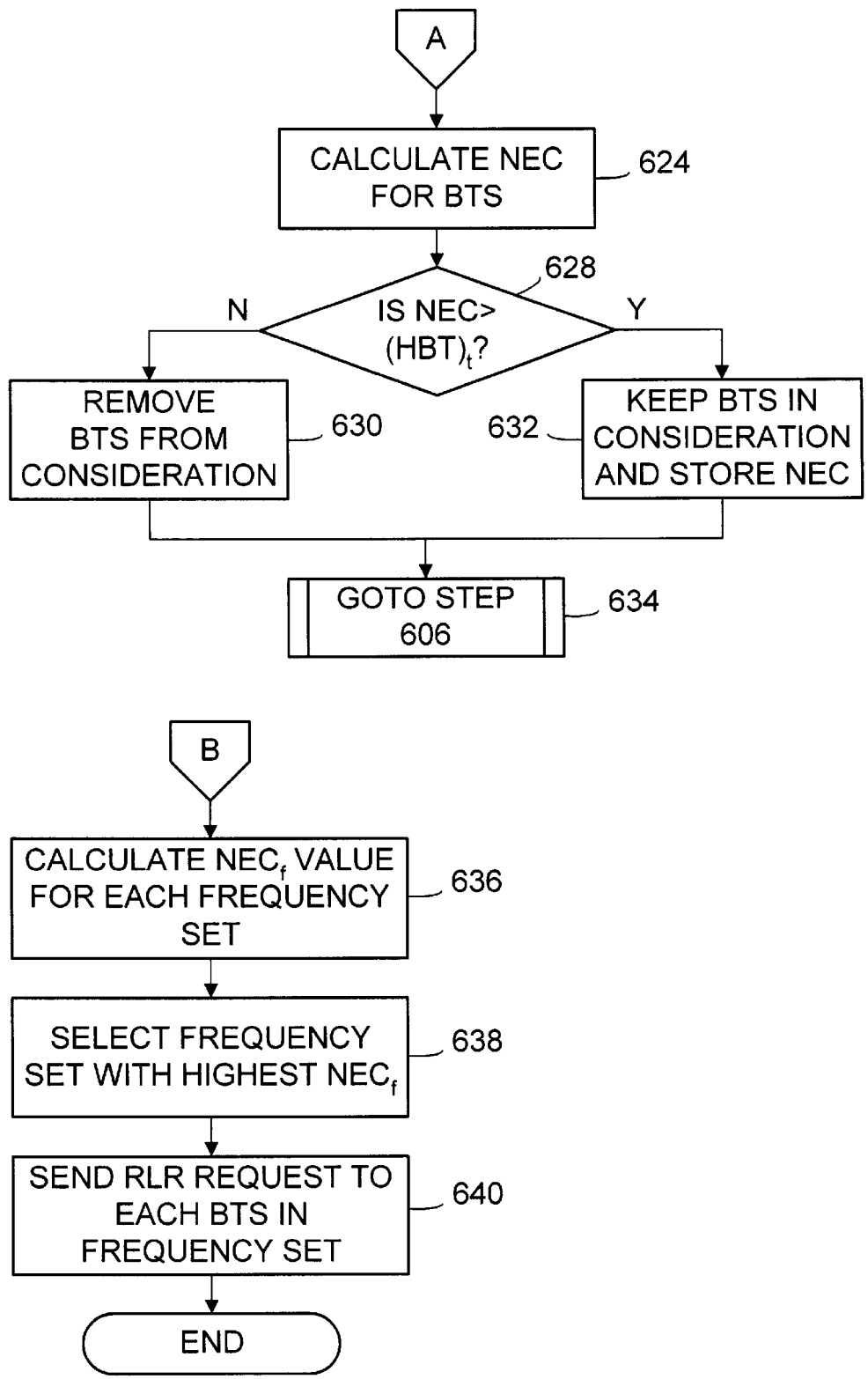

FIGS. 6A and 6B illustrate dynamic load balancing operation according to the present invention. Operation 600 commences at step 602 wherein a PSMM is received from a mobile unit. Then, at step 604, based upon the PSMM, the BSC determines resources available for each of the BTSs reported by the mobile unit and each BTS that serves overlaying areas. The system then sends capacity estimate requests to each of these BTSs. Operation proceeds from step 604 to step 606 wherein the wireless communication system waits for responses from the queried BTSs.

If a response is received at step 612 operation proceeds via off page connector A to step 624 of FIG. 6B wherein the NEC is calculated for the BTS. Once the NEC for the BTS is calculated operation proceeds to step 628 where it is determined whether the NEC is greater than the $HBT_t$. If so, operation proceeds to step 632 wherein the BTS is kept in consideration and the respective NEC is stored. From step 632 operation proceeds via step 634 back to step 606 of FIG. 6A. However, if at step 626 it is determined that the NEC is not greater than $HBT_t$ for the BTS, the BTS is removed from consideration at step 630. From step 630 operation proceeds then to step 634 which sends operation back to step 606 of FIG. 6A.

Referring again to FIG. 6A, when all responses have been received at step 610, the timer is stopped at step 614 and operation proceeds to step 616. Further, when the timer is expired at step 608 operation proceeds to step 616. At step 616, all BTSs under consideration are grouped into frequency sets. As is evident, the number of frequency sets will be determined by the number of different carrier frequencies supported by the BTSs that have responded. From step 616, operation proceeds to step 618 wherein frequency sets that provide only partial coverage for the areas under consideration are removed. Then, at step 620 it is determined whether any frequency set is under consideration. If no frequency sets are under consideration at step 620, operation proceeds to step 622 wherein a soft handoff denied response is sent to the mobile unit. However, if any frequency is under consideration at step 620 operation proceed through off page connector B to step 636 at FIG. 6B.

At step 636 of FIG. 6B, the $NEC_f$ value is calculated for each frequency set. Then, at step 638, the frequency set with the highest $NEC_f$ is selected. At step 640 a radio link resource request is sent to each BTS in the selected frequency set which directs the BTSs to operate, such selected BTSs corresponding to the carrier frequency selected. Such continued operation may execute a soft handoff on the previously selected carrier frequency or may cause the mobile unit to perform a hard handoff to a different carrier frequency.

Figure 7:
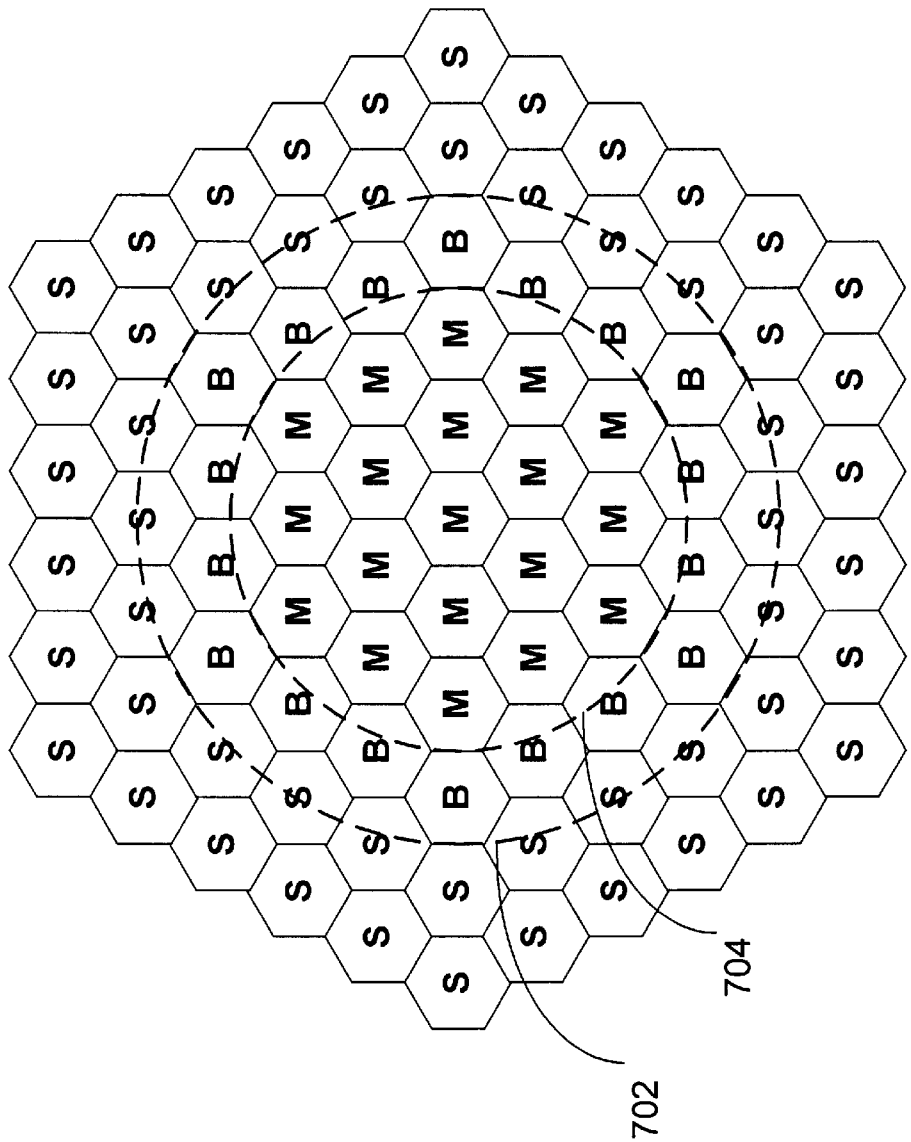
FIG. 7 is a diagram illustrating a layout of a wireless communication system having multiple carrier cells, border cells and single frequency cells.

FIG. 7 illustrates a plurality of cells in a wireless communication system 700 constructed according to the present invention. As is shown, the wireless communication system 700 includes a plurality of multiple carrier frequency cells (M), a plurality of border cells (B) and a plurality of single carrier frequency cells (S). In the installation illustrated, the multiple carrier frequency cells support two or more carrier frequencies while the single frequency cells support only a single carrier frequency. A typical installation of such a system 700 may be in a densely populated downtown area such as the greater Dallas area wherein multiple carrier frequency cells are placed in areas where load density exceeds the capacity that could be served by a single carrier frequency cell. In geographic areas of high density of use, the multiple carrier cells are installed to increase the capacity of those particular cells. However, in the outlying areas, the single frequency cells provide sufficient capacity to service the needs of the users that operate within those cells.

Zone 1 is defined by line 704 to include the multiple carrier cells while zone 2 is defined by line 702 to include only the single frequency cells, such single frequency cells lying outside of circle 702. The area between circles 702 and 704 defines the border zones for the system 700. Mobile units originating calls within zone 2 outside of circle 702 must always originate on carrier F1 and are allocated resources only on frequency F1. Mobile units originating calls within zone 1 may originate a call on either carrier F1 or carrier F2 (the two carriers supported within zone 1) with resources allocated on frequency F1 or frequency F2. Finally, mobile units originating calls within the border zone between circles 702 and 704 must always originate calls on carrier F1 and are allocated resources on frequency F1.

Once a call has been set up with a mobile unit and is being serviced within the wireless communication system 700, as the mobile unit roams, operations must occur that consider the limitations of the multiple carrier frequency cells M, the border cells B and the single frequency cells S. Mobile units roaming within zone 2 and being served by single frequency cells S, are handed off from cell to cell using soft handoff on frequency F1. Mobiles roaming within zone 1 and being served by multiple carrier frequency cells M also are handed off from cell to cell on their current carrier frequency using soft handoff, their current carrier frequency being either frequency F1 or frequency F2.

Mobiles crossing boundaries from zone 2 to zone 1 stay on carrier frequency F1 and therefore also are handed off between cells using soft handoff. However, mobile units crossing the boundaries from zone 1 to zone 2 that were allocated resources on frequency F2 are handed off using hard handoff to frequency F1 at the border cells. Finally, mobile units operating on frequency F1 crossing boundaries between zone 1 and zone 2 in either direction are handed off using soft handoff and remain on frequency F1. Mobile units to which service is originated while operating in the border cells may be allocated resources on either frequency F1 or frequency F2 depending upon whether the border cells operate according to the principles previously described with respect to resource allocation.

Figure 8:
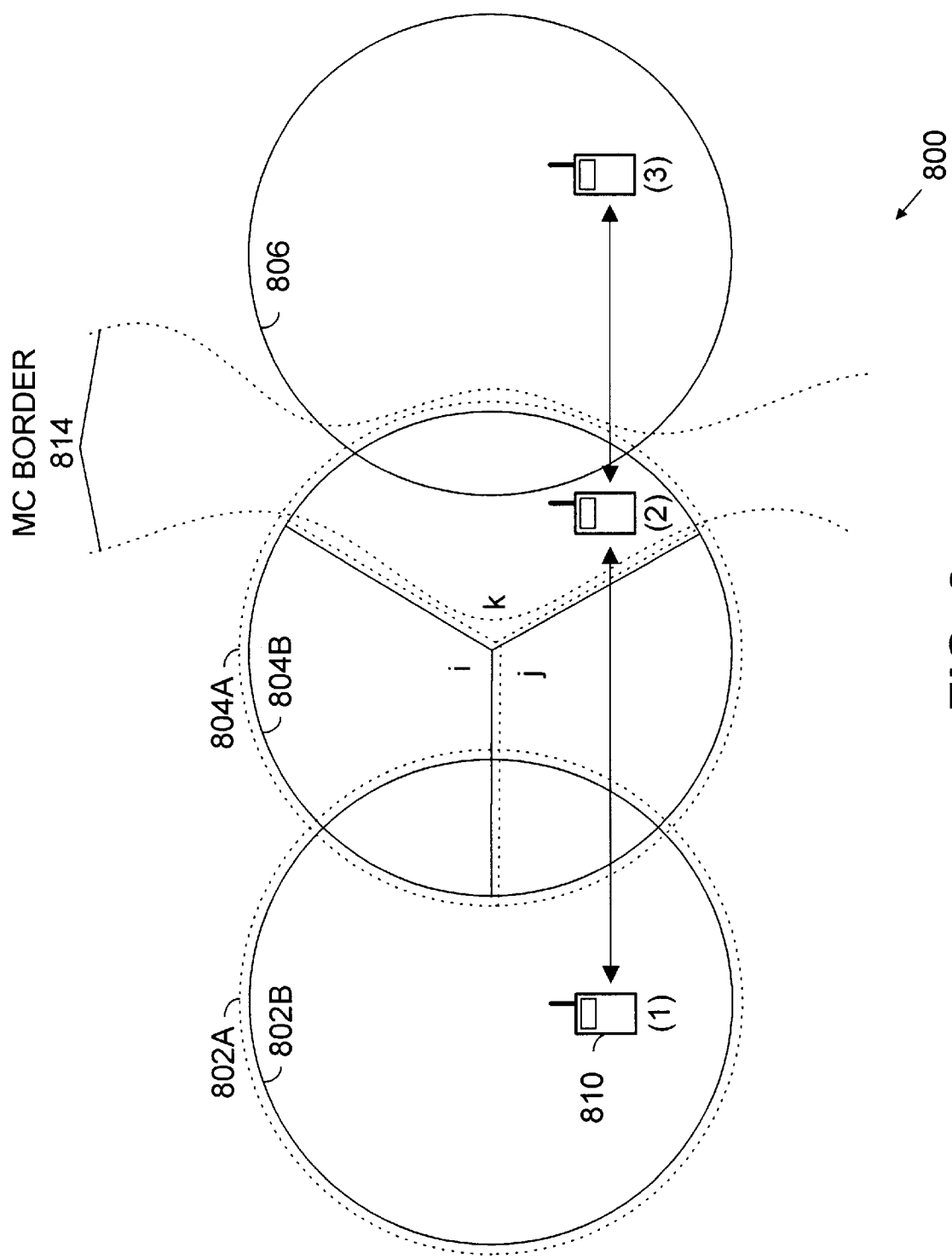
FIG. 8 is a diagram illustrating in more detail cells previously introduced in FIG. 7 at a border region that are sectorized.

FIG. 8 illustrates a border region 800 of a wireless communication system, such as the border region residing generally located near circles 702 and 704 of FIG. 7. The border region 800 includes multiple carrier frequency cells that include overlying cells 802A and 802B operating on a first carrier frequency F1 and a second carrier frequency F2, respectively. Single carrier frequency cell 806 operates on the first carrier frequency F1 and adjoins a border 814. On the border, cell 804A operates on the first carrier frequency F1 and cell 804B operates on the second carrier frequency F2, cell 804A overlaying cell 804B. As is shown, cells 804A and 804B each include sectors i, j and k. The border 814 is defined as the area in which sector k of both cells 804A and 804B overlay cell 806.

Also shown in FIG. 8 is a mobile unit 810 that may reside at positions 1, 2, and 3 during its operation. When the mobile unit 810 originates a call at position (3), it is allocated resources on carrier frequency F1 served by cell 806 since only carrier frequency F1 is supported within cell 806. Then, when the mobile unit 810 moves from position (3) to position (2) within sector k of border cell 804A, soft handoff is performed from cell 806 to cell 804A sector k. Then, when the mobile unit 810 moves from position (2) to position (1), soft handoff is performed from cell 804A sector k to cell 804A sector j and from 804A sector j to cell 802A.

When the mobile unit 810 originates a call at position (1), it may be allocated resources on either carrier frequency F1 or F2 and be served by 802A or 802B, respectively. With the mobile unit 810 moving from position (1) to position (2) to position (3) on frequency F1, soft handoff is performed from cell 802A to cell 804A sector j, to cell 804A sector k and then to cell 806 on carrier frequency F1. On the other hand, if the mobile unit originates a call at position (1) on carrier frequency F2 in cell 802B then soft hand will be performed from cell 802B to cell 804B sector j and to cell 804B sector k on carrier frequency F2. However, hard handoff is then performed from cell 804A sector k on carrier frequency F1 to cell 804B sector k on carrier frequency F2. Once the hard handoff has been performed, soft handoff will then be performed from cell 804B sector k to cell 806 on frequency F2. When the mobile unit 810 originates a call at position (2), the mobile unit 810 will be allocated resources on frequency F1 within sector k of cell 804A. Operation will then proceed accordingly assuming the originating carrier frequency F1.

Paging of mobile units within the various cells may be accomplished on either one or both of the carrier frequencies F1 and F2. Typically, operation is consistent within a single system, such operation using either multiple frequency carriers or a single carrier frequency for control channels. However, when the border 814 is between systems, two different scenarios may occur. In a first scenario, one system uses multiple carrier frequencies for the control channel while the other system uses a single carrier frequency for the control channel. In the second scenario, both systems use multiple carrier frequencies for the control channel. Thus, the mobile units and systems must interact so as to prevent dropped calls when a mobile unit moves from one system to the other. Operation between systems must be coordinated by the system operators.

Figure 9:
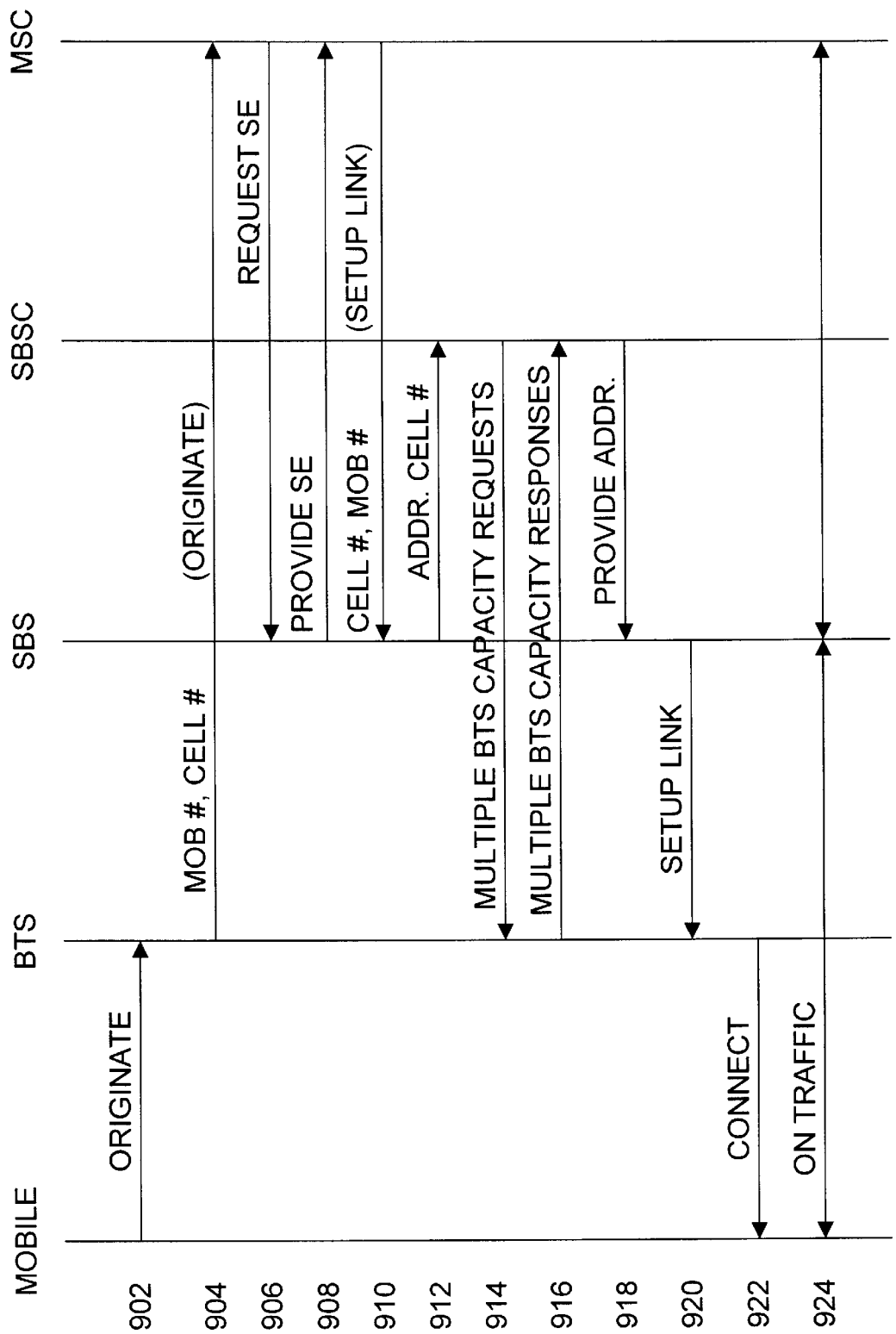
FIG. 9 is a message flow diagram corresponding to operation of the wireless communication system in allocating load in a multiple carrier frequency wireless communication system.

FIG. 9 illustrates the messages that pass among the components of a wireless communication system in originating and servicing a call according to the present invention. At time 902 a mobile unit sends an origination message to a BTS servicing its immediate geographic area. The origination message may be in response to a page or may be initiated in response to a request made by the user of the mobile unit. At time 904, the BTS sends an originate message to the MSC via a BSC coupled to the BTS, the BSC including an SBS and an SBSC. The originate message includes the mobile unit identifier and the cell ID for the BTS. At time 906 the MSC sends a message to the SBS in the BSC, requesting a selector entity to service the call. At time 908, the SBS responds to the MSC, sending the ID of a selector which has been allocated to service the call. At time 910 the MSC then sends a set up link message to the SBS which includes the cell number and mobile number.

The SBS then sends a cell address message to the SBSC, identifying a particular cell from which the mobile unit sent its origination request. In response, at time 914, the SBSC sends out capacity requests to each BTS that may provide service to the mobile unit. Then, at time 916 the BTSs respond to the SBSC with capacity responses. The SBSC then determines which BTS(s) will provide service to the mobile unit based upon the principles of the present invention. In selecting the BTS(s) to provide service, the SBSC investigates the capacity of the responding BTSs consistent with operations described with reference to FIGS. 5A and 5B.

Then, at time 920, the SBS provides a set up link message to the BTS(s), requesting the BTS(s) to service the call to the mobile unit. At time 922, the BTS(s) sends a connect message to the mobile unit requesting that the mobile unit communicate with the BTS(s). Then, at time 924, the call is serviced by the wireless communication system with such servicing continued until the call has either been terminated by the mobile unit or by the wireless communication system.

Figure 10:
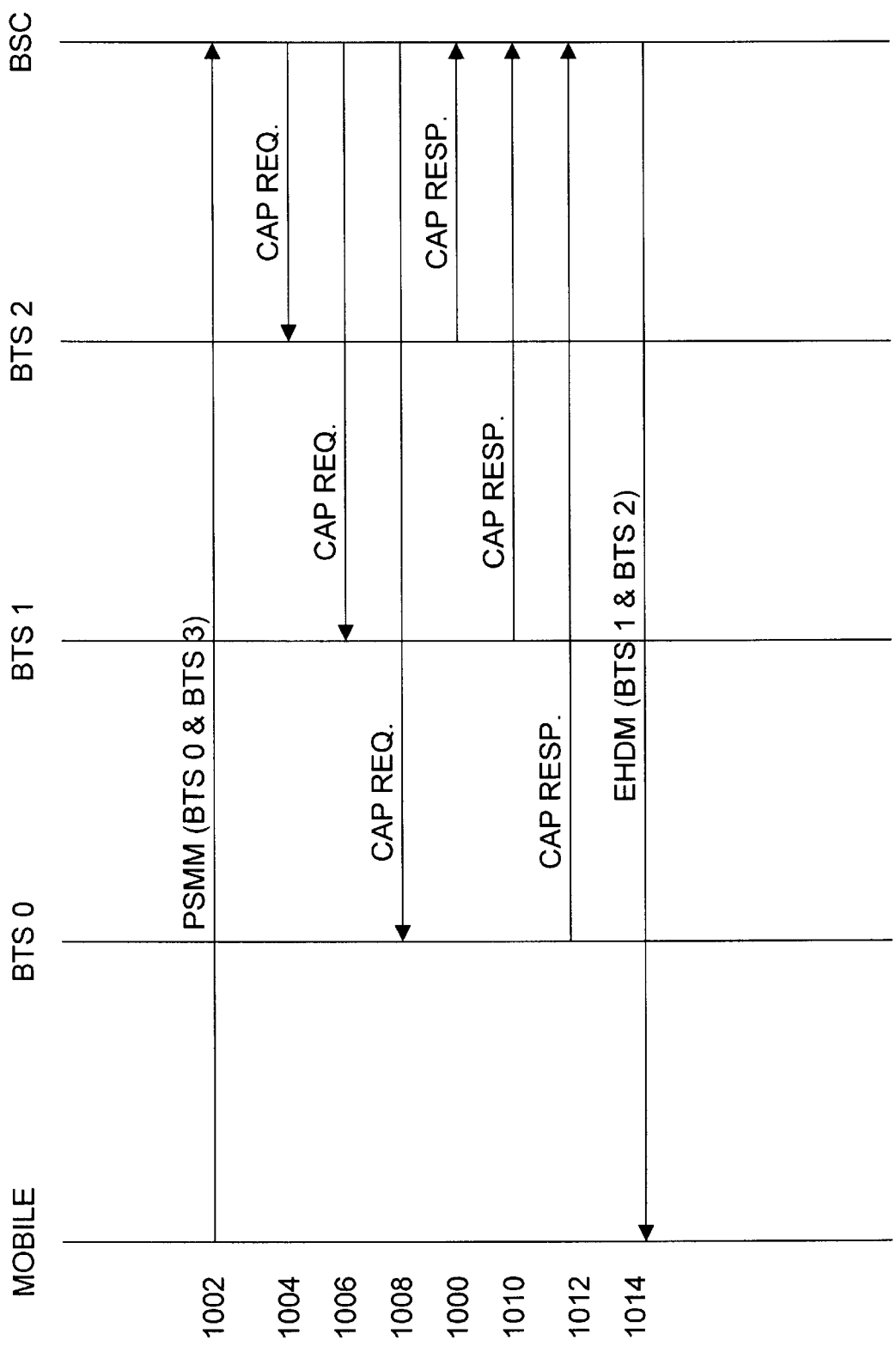
FIG. 10 is a message flow diagram corresponding to operation of the wireless communication system in performing dynamic load balancing in a multiple carrier frequency wireless communication system.

FIG. 10 illustrates the exchange of messages performed in allocating traffic in a multiple carrier frequency system. At time 1002, the mobile unit sends a PSMiM to the BSC via its serving BTS. The PSMM for example includes the identity of BTS 0 and BTS 3. The BSC receives the PSMM, determines the identity of BTS 0 and BTS 0 and three and determines which BTSs are candidates BTSs. The BSC determines that BTSs 0, 1 and 2 are candidate BTSs and sends capacity requests at times 1004, 1006, and 1008 to BTS 2, BTS 1, and BTS 0, respectively. At times 1008, 1010, and 1012, BTS 2, BTS 1 and BTS 0 send capacity response messages to the BSC. Based on the information contained in the capacity request, the BSC selects the particular BTSs that will service the mobile unit and to which handoff of the mobile unit will be executed. At time 1014, the BSC responds to the mobile unit with and extended handoff direction message (EHDM) directing the mobile unit to add BTS 1 and BTS 2 to its active set. The EHDM may simply cause the mobile unit to execute a soft handoff should the mobile unit remain on the same carrier frequency. However, should BTS 1 and BTS 2 provide service on a differing carrier frequency than that currently serving mobile unit, the EHDM message will be used to execute a hard handoff for the mobile unit to a differing carrier frequency.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A wireless communication system that provides wireless service to a mobile unit operating within a service area, the wireless communication system comprising:

a mobile switching center;

at least one base station controller coupled to the mobile switching center, the at least one base station controller producing a capacity request in response to a request made by the mobile unit;

a first plurality of base stations coupled to the at least one base station controller, the first plurality of base stations operating on a first carrier frequency, at least one candidate base station of the first plurality of base stations receiving the capacity request, determining its net excess capacity based upon available forward link resources and available reverse link resources, and responding with a net excess capacity response;

a second plurality of base stations coupled to the at least one base station controller, the second plurality of base stations operating on a second carrier frequency, at least one candidate base station of the second plurality of base stations receiving the capacity request, determining its net excess capacity based upon available forward link resources and available reverse link resources, and responding with a net excess canacity response; and the at least one base station controller operating to assign the mobile unit to at least one responding candidate base station of the first plurality of base stations or to at least one responding candidate base station of the second plurality of base stations based upon received net excess capacity responses.

2. The wireless communication system of claim 1, wherein the first plurality of base stations and the second plurality of base stations provide overlaying wireless coverage.

3. The wireless communication system of claim 1, wherein an assignment is made to a responding base station if a corresponding net excess capacity is greater than a corresponding net excess capacity threshold.

4. The wireless communication system of claim 1, wherein the mobile unit is assigned to at least one of the first plurality of base stations or at least one of the second plurality of base stations upon setting up a call.

5. The wireless communication system of claim 1, wherein the mobile unit is assigned to at least one of the first plurality of base stations or at least one of the second plurality of base stations during the servicing of a call.

6. The wireless communication system of claim 1, wherein cells serviced by the second plurality of base stations overlay cells serviced by some of the first plurality of base stations such that the first carrier frequency is supported throughout the service area and the second carrier frequency is supported in a portion of the service area.

7. The wireless communication system of claim 6, wherein the first plurality of base stations and the second plurality of base stations support border cells that define the portion of the service area supported by both the first carrier frequency and the second carrier frequency.

8. The wireless communication system of claim 7, wherein the border cells support both the first carrier frequency and the second carrier frequency.

9. The wireless communication system of claim 8, where calls originating in the border cells originate only on the first carrier frequency.

10. The wireless communication system of claim 1, wherein the first plurality of base stations and the second plurality of base stations operate according to a code division multiple access protocol.

11. The wireless communication system of claim 10, wherein net excess capacities are also based upon respective forward link blocking threshold levels.

12. The wireless communication system of claim 10, wherein net excess capacities are also based upon respective reverse link blocking threshold levels.

13. The wireless communication system of claim 10, wherein net excess capacities are also based upon respective excess number of channel elements.

14. The wireless communication system of claim 10, wherein net excess capacities are also based upon respective excess number of walsh codes.

15. The wireless communication system of claim 1, wherein the at least one base station controller also considers in its assigment a preferred carrier frequency.

16. In a wireless communication system including a first plurality of base stations that operate on a first carrier frequency and a second plurality of base stations that operate on a second carrier frequency, the first plurality of base stations and the second plurality of base stations providing overlaying service, a method of operation comprising:

receiving a request from a mobile unit;

determining an operational position of the mobile unit based upon the location of a base station receiving the request;

based upon the operational position of the mobile unit, requesting capacity information from candidate base stations of the first plurality of base stations and candidate base stations of the second plurality of base stations;

receiving net excess capacity responses from the candidate base stations, each net excess capacity response based upon available forward link resources and available reverse link resources of a respective candidate base station;

selecting at least one servicing base station from the candidate base stations based upon the received net excess capacity responses, the at least one servicing base station corresponding to either the first carrier frequency or the second carrier frequency; and servicing the mobile unit with the at least one servicing base station on a corresponding carrier frequency.

17. The method of claim 16, wherein the first plurality of base stations and the second plurality of base stations provide overlaying wireless coverage.

18. The method of claim 16, wherein an assignment is made to a candidate base station if a corresponding net excess capacity is greater than a corresponding net excess capacity threshold.

19. The method of claim 16, wherein the request received from the mobile unit is for setting up a call.

20. The method of claim 16, wherein the request received from the mobile unit is for continued servicing of a call.

21. The method of claim 20, wherein the request received from the mobile unit is a pilot signal strength measurement message.

22. The method of claim 16, wherein cells serviced by the second plurality of base stations overlay cells serviced by some of the first plurality of base stations such that the first carrier frequency is supported throughout a service area and the second carrier frequency is supported in a portion of the service area.

23. The method of claim 22, wherein the first plurality of base stations and the second plurality of base stations support border cells that define the portion of the service area supported by both the first carrier frequency and the second carrier frequency.

24. The method of claim 23, wherein the border cells support both the first carrier frequency and the second carrier frequency.

25. The method of claim 24, further comprising the step of originating calls in the border cells only on the first carrier frequency.

26. The method of claim 16, wherein the first plurality of base stations and the second plurality of base stations operate according to a code division multiple access protocol.

27. The method of claim 26, wherein net excess capacities are also based upon respective forward link blocking threshold levels.

28. The method of claim 26, wherein net excess capacities are also based upon respective reverse link blocking threshold levels.

29. The method of claim 26, wherein net excess capacities are also based upon respective excess number of channel elements.

30. The method of claim 26, wherein net excess capacities are also based upon respective excess number of walsh codes.

31. The method of claim 16, wherein a preferred carrier frequency is used in selecting the at least one servicing base station.

32. A computer readable medium that is readable by at least one component of a wireless communication system that includes a first plurality of base stations that operate on a first carrier frequency and a second plurality of base stations that operate on a second carrier frequency and that supports a mobile unit, the first plurality of base stations and the second plurality of base stations providing overlaying service, the computer readable medium comprising:

a first set of instructions that, when executed by the wireless communication system, cause the wireless communication system to receive a request from a mobile unit;

a second set of instructions that, when executed by the wireless communication system, cause the wireless communication system to determine an operational position of the mobile unit based upon the location of a base station receiving the request;

a third set of instructions that, when executed by the wireless communication system, cause the wireless communication system to request capacity information from candidate base stations of the first plurality of base stations and candidate base stations of the second plurality of base stations;

a fourth set of instructions that, when executed by the wireless communication system, cause the wireless communication system to receive net excess capacity responses from the candidate base stations, each net excess capacity response based upon available forward link resources and available reverse link resources for a respective candidate base station;

a fifth set of instructions that, when executed by the wireless communication system, cause the wireless communication system to select at least one servicing base station from the candidate base stations based upon the received net excess capacity responses, the at least one servicing base station corresponding to either the first carrier frequency or the second carrier frequency; and a sixth set of instructions that, when executed by the wireless communication system, cause the wireless communication system to service the mobile unit with the at least one servicing base station on a corresponding carrier frequency.

33. The computer readable medium of claim 32, wherein the first plurality of base stations and the second plurality of base stations provide overlaying wireless coverage.

34. The computer readable medium of claim 32, wherein an assignment is made to a candidate base station if a corresponding net excess capacity is greater than a corresponding net excess capacity threshold.

35. The computer readable medium of claim 32, wherein the request received from the mobile unit is for setting up a call.

36. The computer readable medium of claim 32, wherein the request received from the mobile unit is for continued servicing of a call.

37. The computer readable medium of claim 36, wherein the request received from the mobile unit is a pilot signal strength measurement message.

38. The computer readable medium of claim 32, wherein cells serviced by the second plurality of base stations overlay cells serviced by some of the first plurality of base stations such that the first carrier frequency is supported throughout a service area and the second carrier frequency is supported in a portion of the service area.

39. The computer readable medium of claim 38, wherein the first plurality of base stations and the second plurality of base stations support border cells that define the portion of the service area supported by both the first carrier frequency and the second carrier frequency.

40. The computer readable medium of claim 39, wherein the border cells support both the first carrier frequency and the second carrier frequency.

41. The computer readable medium of claim 40, further comprising:

a sixth set of instructions that, when executed by the wireless communication system, cause the wireless communication system to originate calls in the border cells only on the first carrier frequency.

42. The computer readable medium of claim 32, wherein the first plurality of base stations and the second plurality of base stations operate according to a code division multiple access protocol.

43. The computer readable medium of claim 42, wherein net excess capacities are also based upon respective forward link blocking threshold levels.

44. The computer readable medium of claim 42, wherein net excess capacities are also based upon respective reverse link blocking threshold levels.

45. The computer readable medium of claim 42, wherein net excess capacities are also based upon respective excess number of channel elements.

46. The computer readable medium of claim 42, wherein net excess capacities are also based upon respective excess number of walsh codes.

47. The computer readable medium of claim 42, wherein a preferred carrier frequency is also considered in selecting the at least one servicing base station.

* * * * *